United States Patent [19]

Donze

[11] 4,373,969
[45] Feb. 15, 1983

[54] METHOD OF REMOVING CRACKS, AND MULTIPLE-SHAPE TORCH FOR CARRYING OUT THE METHOD

[75] Inventor: Michel Donze, Essey-les-Nancy, France

[73] Assignee: Etablissements Somalor-Ferrari "Somafer", Uckange, France

[21] Appl. No.: 287,743

[22] PCT Filed: Jan. 14, 1981

[86] PCT No.: PCT/FR81/00005
§ 371 Date: Jul. 30, 1981
§ 102(e) Date: Jul. 30, 1981

[87] PCT Pub. No.: WO81/01973
PCT Pub. Date: Jul. 23, 1981

[30] Foreign Application Priority Data
Jan. 18, 1980 [FR] France ............... 80 01555

[51] Int. Cl.³ .............................. B23K 7/06
[52] U.S. Cl. .................... 148/9.5; 266/51
[58] Field of Search ............ 148/9.5; 266/51, 52

[56] References Cited

U.S. PATENT DOCUMENTS

| | | | |
|---|---|---|---|
| 3,411,466 | 11/1968 | Pfeuffer | 266/52 |
| 3,455,747 | 7/1969 | Lytle | 266/74 |
| 4,013,486 | 3/1977 | Engel | 148/9.5 |

FOREIGN PATENT DOCUMENTS

| | | |
|---|---|---|
| 299902 | 8/1917 | Fed. Rep. of Germany . |
| 628135 | 3/1936 | Fed. Rep. of Germany . |
| 1529207 | 7/1971 | Fed. Rep. of Germany . |

*Primary Examiner*—W. Stallard
*Attorney, Agent, or Firm*—Dennison, Meserole, Pollack & Scheiner

[57] ABSTRACT

The invention concerns a method of selective crack removal from ingots and slabs, and the torch for carrying out the method.

The method comprises burning surface impurities with a jet of oxygen, the strength and shape of which vary continually according to the characteristics of the defect to be removed. The torch for carrying out the method has an oxygen nozzle which is divided into a plurality of parallel pipes, the supply of gas to the pipes being controlled individually.

The method allows cracks to be removed economically and rapidly from metallurgical products such as ingots and slabs.

7 Claims, 2 Drawing Figures

METHOD OF REMOVING CRACKS, AND MULTIPLE-SHAPE TORCH FOR CARRYING OUT THE METHOD

The constant improvement in quality required for steel products together with the economies which have to be made in production costs lead to a continuous search for improvement in the quality and particularly the surface condition of semimanufactured products (ingots, blooms, slabs, billets, etc.) at an early stage of steel manufacture.

Crack removal by torch is a known method of burning the imperfect metal with a jet of pure oxygen, ie, eliminating surface defects: cracks, faults, burns and inclusions.

These torches may be manual or supported by machines. With torches used on machines, it is known to work by two very different methods: (1) high speed method known as washing or "scarfing". The method comprises burning the whole surface of the semimanufactured product to a constant, statistically defined depth, with a view to removing a large proportion of the surface defect, the work admittedly being completed by subsequent checking and additional repair of the product.

For this purpose it is known to use machines supporting a bank of oxygen torches, arranged in parallel to form a straight combustion bath, the combustion bath being displaced transversely to the semimanufactured product, sweeping over the whole of its surface. Even if the strength, ie the output, of the torches is programed as a function of the defects observed, the metal is burnt over the whole metallic surface of the product. This method has the serious disadvantage of wasting a large amount of metal.

(2) Selective method: so-called selective machines are used, with large torches of cylindrical cross section mounted on them and guided visually by the operator. This method is less rapid and removes only the imperfect parts of the metal.

The advantage of these machines lies in the improvement in the material yield because the removal of metal is controlled by the operator, who remains responsible for it and does not burn any good metal.

On the other hand, the performance of these machines, expressed as area treated per unit of time, depends directly on the strength of the torch.

Present solutions are thus based on torches of a strength which is a compromise between the selectivity requirements and productivity over a large area.

Furthermore, it is known:

(a) to make smaller or larger torches, giving smaller or larger combustion zones and thus enabling different quantities of metal to be removed at constant speed by lesser and greater displacement of the combustion bath;

(b) to have the combustion zone displaced more or less quickly, and thus to burn more or less metal with the same torch according to the speed of displacement;

(c) that the shape of the combustion zone determines the profile remaining on the treated article after burning;

(d) that combustion of the metal leads to the formation of liquid slags which solidify instantaneously away from the action of the combustion zone;

(e) that with certain varieties of steel, particularly those containing little carbon, the portion of metal under the combustion zone becomes fused without oxidation; that the kinetic energy of the oxygen projects the fused metal outside the combustion zone together with the slags; and that its abrupt solidification causes adhering burrs to form;

(f) that the orientation of the oxygen jet enables the area of the combustion zone to be varied, thereby varying the profile left on the treated article;

(g) that for light surfacing a jet of oxygen in the shape of a flat paint brush gives a rectangular combustion zone of which the short side can be cut back, causing a thin layer of metal to be removed over a large area;

(h) that torches of different shape or different strength have to be used to obtain any of the results enumerated in the seven above points.

The object of the invention is to define a method of crack removal which is selective, ie which burns only the minimum of metal on the surface of the semimanufactured product, and yet with good productivity, with the maximum of imperfect metal being burnt very rapidly where such burning is necessary.

The method comprises removing cracks selectively with a multiple shape jet of oxygen, that is to say, removing cracks with a jet of oxygen of adjustable strength surrounded by heating flames, as in the prior art, but also of variable transverse cross section which is varied both in area and in shape from the outlet of the nozzle. The jet of oxygen varying both in strength, ie output, and in cross section, is formed by using a group of component jets arranged in a compact cluster and controlled individually or sector by sector, their orientation being adjustable as a unit, in place of a single jet emitted through a single pipe.

The heating flames surrounding the cluster are also controlled individually or sector by sector. Thus at any moment there is a jet of oxygen of strength and cross section which can be adapted as a unit to the depth, the surface and the nature of the defects to be eliminated. The shape and strength of the jet vary independently of one another. There may be a long, narrow jet formed by a few component jets operating with a large output, or a short, wide jet formed by the group of component jets each operating with a low output. The cross section of the jet can be any of various shapes such as round, oval or rectangular, depending on the number and arrangement of the jets in operation. To provide this flexibility, the component jets are grouped in a compact cluster of cross section which, if not circular, at least is of comparable length and thickness.

Another object of the invention is to define a torch for carrying out the process. The oxygen jet of the torch according to the invention is divided into a plurality of parallel, contiguous pipes which are grouped in a compact cluster. The cluster is itself surrounded by burners for the heating gas. The pipes and burners are provided with individual means for supplying gas, oxygen or a heating mixture respectively; each of the supply means is individually adjustable. The cross section of the cluster of pipes is usually circular although it may have other shapes such as oval or rectangular.

Thus, the torch according to the invention may be converted instantly, as required, into a torch of cylindrical section, a torch of flat section for shallow surfacing, or a torch of elliptical section, giving an arrangement midway between the flat jet and cylindrical jet torches, or even to a torch with the cross section best adapted to the defect to be removed. This enables instant variation of the depth of metal to be removed, when a defect of greater or less depth is sighted during a surfacing operation.

The invention will be better understood from the description of a torch according to the invention referring to the two accompanying diagrammatic drawings, and from the explanation of how the torch is used. The torch described hereinafter is only a nonlimiting example. In the drawings.

Figure 1:
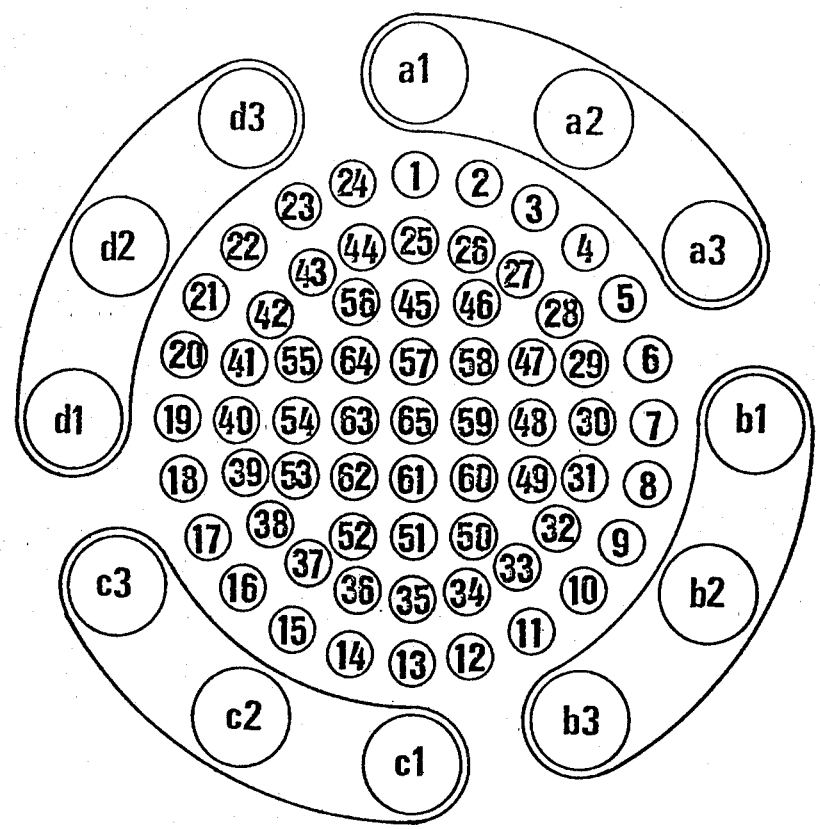
FIG. 1 is a diagrammatic front elevation of the outlet orifice of the torch.

The torch, the end of which is shown in FIG. 1, is formed by a cluster of 65 oxygen pipes 8 mm in diameter at the neck, ie 12 mm in diameter at the outlet with a distance of approximately 13 mm between axes.

The pipes are numbered in the Figure from 1 to 65. The 65 contiguous pipes can each emit a jet of oxygen of approximately 20 to 60 m3/h, i.e. altogether a maximum of approximately 4000 m3/h. The 65 oxygen pipes are surrounded by 12 nozzles or burners for heating gas, 30 mm in diameter. The 12 burners are distributed between four sectors, a, b, c, d, and may be controlled individually or sector by sector.

Figure 2:
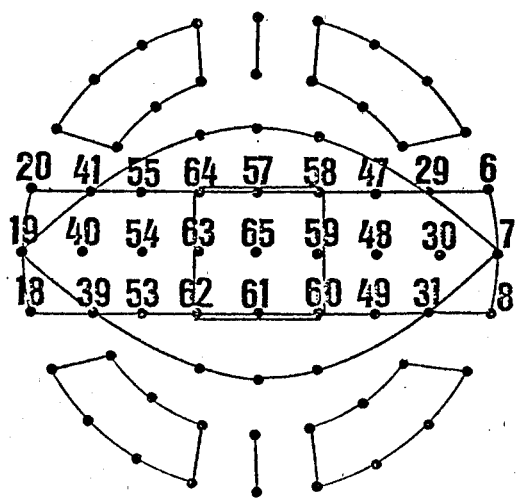
FIG. 2 is a diagrammatic cross section, showing some shapes of oxygen jet obtained with the torch according to the invention.

The cross sections of the oxygen jets obtained by using only one part or the other of the pipes are shown in FIG. 2. Thus with central pipes 57, 58, 59, 60, 61, 62, 63, 64, 65, a jet of oxygen of relatively small cross section is obtained, adapted to burn a defect of small area.

The use of pipes with a cross section such as pipes 6, 7, 8, 18, 19, 20, 29, 30, 31, 39, 40, 41, 47, 48, 49, 53, 54, 55, 57, 58, 59, 60, 61, 62, 63, 64 and 65 gives a flat jet adapted to burn wide shallow defects with oxygen on a product which requires complete surfacing. The group 7, 29, 30, 31, 47, 48, 49, 53, 54, 55, 39, 40, 41, 19 may also be used for surface defects.

FIG. 2 also shows other combinations of oxygen pipes which, taken together, give jets of variable section adapted to burn defects with very varied characteristics.

It will be seen that the method comprises using the number and arrangement of pipes which, taken together, will form the oxygen jet of variable cross section which at any given moment is best adapted to the defect encountered; this can be done independently of the pressure of oxygen supplying each of the pipes. The pressure may remain constant, e.g., if the depth of defect does not change. The torch can really be described as a multiple shape torch. However, there is nothing preventing the pressure of the oxygen supplying each of the pipes from being changed at any moment. This brings the further possibility of instant selectivity, by adapting the output of oxygen to the depth of the defects encountered.

It will be appreciated that a torch of this size with large outputs of gas cannot be controlled manually. It has to be fitted on a robot manipulator, which will give free control of its orientation and displacement. The heating burners $a_1$, $a_2$, $a_3$, $b_1$, $b_2$, $b_3$, $c_1$, $c_2$, $c_3$, $d_1$, $d_2$, $d_3$ may also be controlled individually or in sectors a, b, c, d, depending on the strength and area of heating required.

The 65 pipes of the torch as illustrated are arranged in a cluster of circular cross section. For some special applications, the pipes could be combined in a cluster of different cross section, e.g. rectangular, oval, or elliptical.

I claim:

1. A method of removing cracks with an oxygen jet of adjustable strength and direction, surrounded by heating flames, the cross section of said jet being variable characterized in that during the crack removal process the shape of the cross section of the jet is varied independently of its strength to adapt to the area surface of the cracks.

2. The method of claim 1, characterized in that the oxygen jet is formed by grouping parallel component jets, arranged in a compact cluster and controlled individually.

3. The method of claim 1 or 2, characterized in that the heating flames are formed from component flames arranged at the periphery and controlled individually or sector by sector.

4. A multiple-shape torch for carrying out the crack removal process of claim 1, or 2, characterized in that its oxygen jet is divided into a plurality of contiguous pipes grouped in a compact cluster, that the cluster is surrounded by heating burners, that the pipes and burners are provided with individual means for supplying gas, oxygen or a heating mixture respectively, and that each of the supply means is individually adjustable.

5. The torch of claim 4, characterized in that the cross section of the cluster of parallel, contiguous pipes is substantially circular.

6. The torch of claim 4, characterized in that the cross section of the cluster of parallel, contiguous pipes is rectangular.

7. The torch of claim 4, characterized in that the cross section of the cluster of parallel, contiguous pipes is elliptical.

* * * * *